2,887,508

LOWER ALKYL ESTER OF ACETONEDICARBOXYLIC ACID

Edgar Kingdon Hamilton, Merrick, and George Lukacs, Forest Hills, N.Y., assignors to Chas. Pfizer & Co., Inc., Brooklyn, N.Y., a corporation of Delaware No Drawing. Application July 17, 1958
Serial No. 749,062

5 Claims. (Cl. 260—483)

This application is concerned with a new and useful method for the production and recovery of lower alkyl esters of acetonedicarboxylic acid. More particularly, it is concerned with an improved method of recovering these valuable esters in an especially high yield utilizing certain critical extraction solvents. These esters are useful catalysts for the polymerization of chloroprene.

In copending patent application Serial No. 697,795, filed November 21, 1957, there is described a method for preparing a lower alkyl ester of acetonedicarboxylic acid which comprises treating citric acid with over 95% concentrated sulfuric acid at a temperature from about 40 to about 65° C., gradually adding to the reaction mixture either sulfur trioxide or oleum and subsequently adding an alcohol containing from one to four carbon atoms. The reaction is then continued at from about 25° to about 45° C. until substantial amounts of an ester are formed. The ester is recovered from the strongly acid reaction mixture by quenching the mixture in water while maintaining the pH at a value of between about 1.5 and 6 and subsequently extracting the valuable material with benzene.

The disclosure in the said copending application describes a method for maintining the pH within the defined limits by simultaneously adding the strongly acid reaction mixture and an alkaline reagent, preferably ammonia to a mixture of ice and water while maintaining a lower temperature, a temperature for example, below 20° C. It will be appreciated by those skilled in the art that partial neutralization of the strongly acid reaction mixture by the addition of an alkaline reagent creates considerable heat energy which is dissipated by the addition of ice, coupled with external cooling, for example, using a brine solution. This is an expensive procedure requiring large amounts of ice and special equipment. Furthermore, the use of the alkaline reagent contributes markedly to the expense of the procedure.

It has now been most unexpectedly discovered that the use of certain critical extraction solvents makes possible the elimination of the alkaline reagent and concomitantly obviates the expensive dissipation of energy by the addition of ice and refrigeration. Furthermore, the yield which can be obtained is higher than has ever before been realized for the production of lower alkyl esters of acetonedicarboxylic acid from citric acid. These solvents are chlorinated alkanes containing up to five carbon atoms and include, for example, chloroform, ethylene dichloride, tetrachloroethane, 1,1-dichloroethane, 1,5-dichloropentane, 1,1,1-trichloroethane, 1,1,2-trichloroethane, 1,1,1,2-tetrachloroethane and 1,2,3-trichloropropane. The preferred solvents, preferred because they give excellent yields and because of their economic availability include chloroform, ethylene dichloride and tetrachloroethane.

In accordance with the procedure of this invention, citric acid is added to concentrated sulfuric acid and then a reagent such as oleum or sulfur trioxide which reacts with water to form only sulfuric acid is added. It is preferred to add at least sufficient oleum or concentrated sulfuric acid to react with each molecule of water evolved and to form less concentrated sulfuric acid. It is, however, possible to use somewhat smaller quantities of these reagents without appreciably affecting the yields. The amount of sulfuric acid originally used is not critical since at least in theory one molecule of sulfuric acid would be sufficient to start the reaction which would then be continued by the addition of the oleum or sulfur trioxide. In practice, however, sufficient sulfuric acid is used to provide a fluid mixture which is readily stirred.

The time of reaction is not critical since some acetonedicarboxylic acid forms almost immediately upon the addition of the sulfuric acid. However, for optimum yields it is preferred that the reaction be carried out over a period of from about one-half hour to about one and one-half hours.

At the end of the reaction period, the mixture is cooled to below 45° C. preferably to about 30 to about 40° C. and the selected alkanol is added. At higher temperatures, the yield falls off sharply and at temperatures lower than 25° C., and excessive period of time may be required. The temperature is maintained within the above range and then lowered to about room temperature, that is, 20 to 30° C., before extraction. As will be explained more fully below, this decrease in temperature is not critical.

In the next step of this valuable process, the reaction mixture is extracted with the selected solvent of this invention. The solvent is removed, for example, by distillation in vacuo. The residue consists of a lower alkyl ester of acetonedicarboxylic acid which is sufficiently pure for most purposes. If a highly purified product is required, this can be obtained by distillation of the residue at lower pressure.

It may be desirable, although it is not necessary, that the organic solution containing the ester be washed with water and then dried over an anhydrous drying agent such as anhydrous sodium sulfate before evaporation in vacuo. It is not necessary to do this, however, since excellent yields are obtained without so doing.

Any of the usual extraction procedures can be used. Under certain conditions, it may be convenient to employ a batchwise method in which the solvent and reaction mixture are commingled, agitated and separated. This is generally not the preferred method of carrying out this invention since with some solvents a number of separate extractions may be required, and this necessitates excessive handling of the reagents. It is preferred to use a continuous countercurrent technique in order to minimize the volume of costly solvent required. If the countercurrent procedure is utilized, any of the usually available commercial systems well known to those skilled in the art, for example, the Podbielniak extractor may be conveniently employed. It is, of course, apparent that the solvents within the purview of this invention must be liquid at the temperature employed.

The selective and critical nature of the solvents is graphically illustrated by the following equipment. Six separate 100 ml. samples each containing 21 g. of dimethylacetonedicarboxylate were prepared. One sample was extracted with benzene, another with hexane and the rest with chlorobenzene, trichloroethylene, chloroform and ethylene dichloride respectively. It was found that the benzene extracted 5.6 g. of the ester, the hexane 0.4 g. and the chlorobenzene, trichloroethylene, chloroform and the ethylene dichloride extracted 6 g., 4 g., 18 g. and 18.5 g. respectively. The superiority of the chloroform and ethylene dichloride is clearly shown. Similarly poor results were obtained with other non-halogenated solvents and with aromatic halogenated solvents. Similarly high recovery was realized with other solvents within the purview of this invention such as tetrachloroethane and 1,1-dichloroethane. Other liquid fluorinated, brominated and iodine substituted alkanes containing up to five carbon atoms may be similarly employed in the practice of this invention but less advantageously either because of their high costs or because of their high boiling points which makes it difficult to remove the extraction solvent under ordinary procedures.

The temperature at which the extraction is carried out is not critical although as is well known a solvent will generally dissolve more solute at a higher temperature than it will dissolve at a lower temperature. For the practice of this invention any convenient temperature say, for example, from about 5° C. to the boiling point of the solvent may be used. It is most convenient to carry out the extraction at room temperature. Since relatively high temperatures can be used it is apparent that it is not always necessary to cool the reaction mixture before extraction.

The amount of extraction solvent is not critical and as will be known to those skilled in the art, it will depend upon the distribution coefficient to the ester in the selected solvent. This can be readily established by independent test tube experiments.

As stated above, the yields obtained in accordance with the practice of this invention are very high. Yields as high as 70% based on the amount of citric acid originally used are consistently obtained and with occasional batches the yield may be as high as 75%. This is a significant increase over the yields obtainable in accordance with prior art procedures. In addition to the improved yield and as pointed out above, the process of this invention has the significant advantage of making it possible to recover lower alkyl esters of acetonedicarboxylic acid from the reaction mixture without the necessity of partial neutralization and cooling.

It has been found that the addition of water prior to extraction with the selected solvent materially increases the efficiency of the process. The addition is not necessary but it has the advantage of decreasing the amount of solvent necessary to obtain similar yields. The amount added is not critical. It will depend on the equipment used and ultimately on the rate at which it is carried out. Without special equipment to provide for the rapid addition of water and rapid heat removal to prevent hydrolysis of the ester, it is usually found that the addition of water amounting to about 10% to about 40% by weight of the reaction mixture and preferably about 20% by weight effects beneficial results. However, larger quantities, even up to 200% by weight, can be employed advantageously.

Any ester in aqueous medium in the presence of an acid catalyst is subject to hydrolysis even at relatively low temperatures. The extent of hydrolysis will depend upon the time of contact between ester and hydrolysis medium. For the purposes of this invention relatively high temperatures, even up to 100° C., are permitted if the extraction is carried out immediately following the addition of the water. With the equipment usually available, it will be convenient to maintain a temperature of from about 10° C. to about 40° C., although temperatures appreciably above and below this range can be tolerated. The preferred temperature range is from about 15° C. to about 25° C.

This application is a continuation-in-part of our copending application Serial No. 709,440, filed January 17, 1958, and now abandoned.

The following examples are given solely for the purpose of illustration and are not to be construed as limitations of this invention, many variations of which are possible without departing from the spirit or scope thereof.

*Example I*

A 30 gallon capacity glass-lined vessel was charged with 92 lbs. of 98–99% sulfuric acid and heated to 55° C. Without stirring, 40 lbs. of citric acid, anhydrous granules, was admitted. After five minutes, when the initial gas surge had diminished, stirring was started. Oleum containing 20% sulfur trioxide was added at the rate of about 0.1 gallons per minute until 3.5 gallons had been added. The reaction temperature was maintained for 1 hour after the start of the oleum addition at 50–55° C. The mixture was then cooled to 35° C. and 8 gallons of anhydrous methanol was added. The reactor temperature was kept at 33–37° C. for three hours, and then cooled to 25° C.

The reaction mixture was extracted with four separate 18 gallon portions of chloroform to remove the ester and the extracts were combined. The chloroform solution was washed with 18 gallons of water and dried over anhydrous sodium sulfate, the drying agent removed by filtration and the solvent stripped off at atmospheric pressure. The crude ester which was obtained as a residue was redistilled below 10 mm. of pressure and the yield of pure product obtained was 75% of theoretical based upon critic acid.

*Example II*

A 300 gal. reaction vessel was charged with 650 pounds of sulfuric acid and heated to 55 to 60° C. Citric acid totaling 300 pounds was added over a period of 15 to 20 seconds.

*Caution.*—Carbon monoxide is vigorously generated by this reaction and can form an explosive mixture with oxygen, therefore, it is best to purge the reaction vessel with nitrogen prior to the addition of citric acid. The reaction, of course, should take place with adequate ventilation. About five minutes after the addition of citric acid 395 pounds of oleum containing 20% sulfur trioxide was added while maintaining the temperature at 50–55° C. The total time for the addition was 50 minutes and the reaction mixture was allowed to stand an additional 10 minutes and then cooled to about 35° C.

To this mixture, there was added 40 gallons of methanol at such a rate that the temperature remained between 33–37° C. The mixture was transferred to a stainless steel propeller agitator tank containing 400 gallons of ethylene dichloride. The organic phase was drawn off and the extraction repeated with an additional 400 gallons of ethylene dichloride. The desired product was obtained by combining the organic extracts and removing the solvent in vacuo. The yield was about 70% based on the amount of citric acid originally used.

*Example III*

A 300 gallon reaction vessel was charged with 650 pounds of sulfuric acid and heated to 55–60° C. Citric acid totaling 300 pounds was added over a period of 25 to 30 seconds. About five minutes after the addition of citric acid 395 pounds of oleum containing 20% sulfur trioxide was added while maintaining the temperature at 50–55° C. The total time for the addition was 50 minutes and the reaction mixture was allowed to stand an additional 10 minutes and then cooled to about 35° C.

To this mixture there was added 40 gallons of methanol at such a rate that the temperature remained between 33–37° C. The reaction mixture was fed to a model 6900 Podbielniak centrifugal extractor at 1.5 gallons per minute vs. tetrachloroethane at 4.0 gallons per minute. The solvent was stripped off in vacuo and the residue distilled at 10 mm. of mercury pressure to give the total yield of 70% theoretical based on the amount of citric acid originally used.

*Example IV*

A 3,000 cc. 3-necked round bottom flask was fitted with a sealed stirrer, a dropping funnel and a condenser vented to an efficient hood. The flask was charged with 600 ml. of 98–99% sulfuric acid and heated to 65° C.

The dropping funnel was removed and 480 g. of citric acid, anhydrous granules, were added rapidly whereupon the dropping funnel was replaced. After three minutes the stirrer was started and 340 ml. of oleum containing 20% sulfur trioxide was added over a thirty minute period. The reaction mixture was maintained at 49–52° C. for one hour after the start of the oleum addition. The mixture was then cooled to 40° C. and 400 ml. of anhydrous methanol was added. The reactor temperature was kept at 35–37° C. for two hours.

The reaction mixture was extracted with four 1.5 liter portions of 1,1-dichloroethane. The extracts were combined, washed with one-quarter of its volume of water, separated and the organic layer dried over anhydrous sodium sulfate. The drying agent was removed by filtration and the filtrate distilled in vacuo to leave the desired product as a residue. The yield was 70% of theoretical based on citric acid.

Example V

A 300 gal. reaction vessel was charged with 650 pounds of sulfuric acid and heated to 55 to 60° C. Citric acid totaling 300 pounds was added over a period of 15 to 20 seconds.

About 5 minutes after the addition of citric acid, 80 pounds of sulfur trioxide was added over a 45 minute period. The mixture was maintained at 50 to 55° C. during the addition and for an additional 35 minutes. It was then cooled to 25° C. To this mixture there was added 40 gallons of methanol at such a rate that the temperature remained between 25 and 35° C. The mixture was transferred to a stainless steel propeller agitator tank containing 400 gallons of ethylene dichloride. It was stirred for two hours and the phases allowed to separate. The organic phase was drawn off, the extraction repeated with an additional 400 gallons of ethylene dichloride and the desired product obtained by combining the organic phases and removing the solvent in vacuo. The yield was about 65% based on the amount of citric acid originally used.

Example VI

A 300 gal. reaction vessel was charged with 650 pounds of sulfuric acid and heated to 55 to 60° C. Citric acid totaling 300 pounds was added over a period of 15 to 20 seconds.

About 5 minutes after the addition of citric acid, 80 pounds of sulfur trioxide was added over a 45 minute period. The mixture was maintained at 50 to 55° C. for an additional 10 minutes and then cooled to 35° C. To this mixture there was added 40 gallons of methanol at such a rate that the temperature remained between 35 and 40° C. The reaction mixture was fed to a model 6900 Podbielnaik centrifugal extractor at 1.5 gallons per minute vs. tetrachloroethane at 4.0 gallons per minute. The solvent was stripped off in vacuo and the residue distilled at 10 mm. of mercury pressure to give the total yield of 70% theoretical based on the amount of citric acid originally used.

Example VII

A 300 gallon reaction vessel was charged with 650 pounds of sulfuric acid and heated to 55–60° C. Citric acid totaling 300 pounds was added over a period of 25 to 30 seconds. About five minutes after the addition of citric acid, 395 pounds of oleum containing 20% sulfur trioxide was added while maintaining the temperature at 50–55° C. The total time for the addition was 50 minutes and the reaction mixture was allowed to stand an additional 10 minutes and then cooled to about 35° C.

To this mixture there was added 40 gallons of methanol at such a rate that the temperature remained between 33–37° C. The reaction mixture was allowed to stand an additional 30 minutes and then cooled to about 15° C. There was added 30 gallons of water at such a rate that the temperature remained between 15–25° C. The reaction mixture was fed to a model 6900 Podbielniak centrifugal extractor at 1.5 gallons per minute vs. tetrachloroethane at 3.0 gallons per minute. The solvent was stripped off in vacuo and the residue distilled at 10 mm. of mercury pressure to give the total yield of 70% of theoretical based on the amount of citric acid originally used.

Example VIII

A 3,000 cc. 3-necked round bottom flask was fitted with a sealed stirrer, a dropping funnel and a condenser vented to an efficient hood. The flask was charged with 600 ml. of 98–99% sulfuric acid and heated to 65° C. The dropping funnel was removed and 480 g. of citric acid, anhydrous granules, were added rapidly whereupon the dropping funnel was replaced. After three minutes the stirrer was started and 340 ml. of oleum containing 20% sulfur trioxide was added over a twenty minute period. The reaction mixture was maintained at 49–52° C. for one hour after the start of the oleum addition. The mixture was then cooled to 40° C. and 400 ml. of anhydrous methanol was added. The reaction temperature was kept at 35–37° C. for two hours. The reaction mixture was then cooled to 15° C. and 700 ml. of water was added at such a rate that the temperature remained between 15–20° C.

The reaction mixture was extracted with four 1 liter portions of 1,1-dichloroethane. The extracts were combined, washed with one-quarter of its volume of water, separated and the organic layer dried over anhydrous sodium sulfate. The drying agent was removed by filtration and the filtrate distilled in vacuo to leave the desired product as a residue. The yield was 70% of theoretical based on citric acid.

Example IX

A 3,000 cc. 3-necked round bottom flask was fitted with a sealed stirrer, a dropping funnel and a condenser vented to an efficient hood. The flask was charged with 600 ml. of 98–99% sulfuric acid and heated to 65° C. The dropping funnel was removed and 480 g. of citric acid, anhydrous granules, were added rapidly whereupon the dropping funnel was replaced. After three minutes the stirrer was started and 340 ml. of oleum containing 20% sulfur trioxide was added over a twenty-five minute period. The reaction mixture was maintained at 49–52° C. for one hour after the start of the oleum addition. The mixture was then cooled to 40° C. and 400 ml. of anhydrous methanol was added. The reaction temperature was kept at 35–37° C. for two hours. The reaction mixture was then cooled to 15° C. and 800 ml. of water was added at such a rate that the temperature remained between 15–20° C.

The reaction mixture was extracted with four one l. portions of 1,1-dichloroethane. The extracts were combined, washed with one-quarter of its volume of water, separated and the organic layer dried over anhydrous sodium sulfate. The drying agent was removed by filtration and the filtrate distilled in vacuo to leave the desired product as a residue. The yield was 70% of theoretical based on citric acid.

Example X

A 3,000 cc. 3-necked round bottom flask was fitted with a sealed stirrer, a dropping funnel and a condenser vented to an efficient hood. The flask was charged with 600 ml. of 98–99% sulfuric acid and heated to 65° C. The dropping funnel was removed and 480 g. of citric acid, anhydrous granules, were added rapidly whereupon the dropping funnel was replaced. After three minutes the stirrer was started and 340 ml. of oleum containing 20% sulfur trioxide was added over a thirty minute period. The reaction mixture was maintained at 49–52° C. for one hour after the start of the oleum addition, The mixture was then cooled to 40° C. and 400 ml. of anhydrous methanol was added. The reaction temperature was kept at 35–37° C. for two hours. The reaction mixture was then cooled to 15° C. and 250 ml. of water was added at such a rate that the temperature remained between 15–20° C.

The reaction mixture was extracted with four one l. portions of 1,1-tetrachloroethane. The extracts were combined, washed with one-quarter of its volume of water, separated and the organic layer dried over anhydrous sodium sulfate. The drying agent was removed by filtration and the filtrate distilled in vacuo to leave the desired product as a residue. The yield was 65% of theoretical based on citric acid.

*Example XI*

A 300 gal. reaction vessel was charged with 650 pounds of sulfuric acid and heated to 55 to 60° C. Citric acid totaling 300 pounds was added over a period of 15 to 20 seconds. About five minutes after the addition of citric acid 395 pounds of oleum containing 20% sulfur trioxide was added while maintaining the temperature at 50–55° C. The total time for the addition was 50 minutes and the reaction mixture was allowed to stand an additional 10 minutes and then cooled to about 35° C.

To this mixture there was added 40 gallons of methanol at such a rate that the temperature remained between 33–37° C. The mixture was allowed to stand for an additional 30 minutes and then was cooled to about 15° C. Water totaling 50 gallons was added at such a rate that the temperature remained between 15–20° C. The mixture was transferred to a stainless steel propeller agitator tank containing 250 gallons of ethylene dichloride. It was stirred for two hours and the phases allowed to separate. The organic layer was drawn off and was extracted with a second portion of 250 gallons of ethylene dichloride. The desired product was obtained by removal of the solvent in vacuo. The yield was about 70% of theoretical based on citric acid used.

These last six examples should be contrasted with the previous examples, particularly Examples II, III and IV. It will be noted that similar yields are obtained using smaller amounts of extraction solvents when water is added to the reaction mixture prior to extraction.

*Example XII*

The procedures of Examples I through XI were repeated using ethanol, propanol, isopropanol or butanol in place of methanol. The corresponding esters were obtained, the propanol and butanol esters being obtained as residue following the removal of the solvent.

*Example XIII*

The procedures of Example I through XII were repeated using other halogenated solvents including chloroform, ethylene dichloride, tetrachloroethane, 1,1-dichloroethane, 1,5-dichloropentane, 1,1,1-trichloroethane, 1,1,2-trichloroethane, 1,1,1,2-tetrachloroethane and 1,2,3-trichloropropane and similar results were obtained.

What is claimed is:

1. A process for preparing a lower alkyl ester of acetonedicarboxylic acid which comprises treating citric acid with over 95% concentrated sulfuric acid at an elevated temperature of from about 40° C. to about 65° C., gradually adding to the reaction mixture a reagent selected from the group consisting of oleum and sulfur trioxide, cooling resulting reaction mixture to from about 25° C. to about 45° C., adding an alcohol containing from one to four carbon atoms, maintaining the temperature of resultant mixture at from about 25° C. to about 45° C. until substantial amounts of an ester of acetonedicarboxylic acid are formed and extracting the reaction mixture with a chlorinated alkane containing up to five carbon atoms.

2. A process as in claim 1 wherein the solvent is chloroform.

3. A process as in claim 1 wherein the solvent is ethylene dichloride.

4. A process as in claim 1 wherein the solvent is tetrachloroethane.

5. A process for preparing a lower alkyl ester of acetonedicarboxylic acid which comprises treating citric acid with over 95% concentrated sulfuric acid at an elevated temperature of from about 40° to about 65° C., gradually adding to the reaction mixture a reagent selected from the group consisting of oleum and sulfur trioxide, cooling resulting reaction mixture to from about 25° C. to about 45° C., adding an alcohol containing from one to four carbon atoms, maintaining the temperature of resultant mixture at from about 25° C. to about 45° C. until substantial amounts of an ester of acetonedicarboxylic acid are formed, adding water in an amount equal to about 10% to about 40% by weight of the reaction mixture and extracting the reaction mixture with a chlorinated alkane containing up to five carbon atoms.

References Cited in the file of this patent

FOREIGN PATENTS 32,245     Germany _____ July 9, 1885

OTHER REFERENCES

Archer et al.: J. Am. Chem. Soc. 66, 1657 (1944).